US012604793B2

(12) United States Patent
Asche et al.

(10) Patent No.: US 12,604,793 B2
(45) Date of Patent: *Apr. 21, 2026

(54) DISTRIBUTOR FOR GRANULAR MATERIAL

(71) Applicant: Amazonen-Werke H. Dreyer SE & Co. KG, Hasbergen (DE)

(72) Inventors: Ingo Asche, Hude (DE); Jan Flucke, Hude (DE); Thomas Wien, Stuhr (DE); Helmut Bruns, Berne (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 775 days.

This patent is subject to a terminal disclaimer.

(21) Appl. No.: 17/906,002

(22) PCT Filed: Mar. 8, 2021

(86) PCT No.: PCT/EP2021/055718
§ 371 (c)(1),
(2) Date: Sep. 9, 2022

(87) PCT Pub. No.: WO2021/180615
PCT Pub. Date: Sep. 16, 2021

(65) Prior Publication Data
US 2023/0109764 A1 Apr. 13, 2023

(30) Foreign Application Priority Data
Mar. 13, 2020 (DE) ......................... 102020106966.9

(51) Int. Cl.
*A01C 7/08* (2006.01)
*B05B 7/14* (2006.01)
*B05B 14/10* (2018.01)

(52) U.S. Cl.
CPC ............ *A01C 7/082* (2013.01); *B05B 7/1486* (2013.01); *B05B 14/10* (2018.02)

(58) Field of Classification Search
None
See application file for complete search history.

(56) References Cited

U.S. PATENT DOCUMENTS 10,779,460 B2 * 9/2020 Pirkenseer ............. A01C 7/084
12,193,353 B2 * 1/2025 Wien ...................... A01C 7/084
(Continued)

FOREIGN PATENT DOCUMENTS

CA 3000028 A1 * 4/2017 ............. A01C 7/084
DE 102009003791 A1 * 10/2010 ............. A01C 7/082
(Continued)

OTHER PUBLICATIONS

International Search Report and Written Opinion of the International Searching Authority mailed Jun. 2, 2021 to Amazonen-Werke H. Dreyer Se & Co. Kg for PCT/EP2021/055718.

*Primary Examiner* — Frederick C Nicolas
*Assistant Examiner* — Michael J. Melaragno
(74) *Attorney, Agent, or Firm* — Potomac Law Group, PLLC; John (Jack) Penny

(57) ABSTRACT

The invention relates to a distributor for granular material, having a distributor head, which is designed to divide up an air-material main flow supplied through a main conveying line to the distributor head into a plurality of air-material individual flows, and at least one return device, which comprises a movable deflecting element, which is designed, in a delivery position, to supply an air-material individual flow flowing into an inflow region of the return device to a delivery region, connected to a delivery line, of the return device and, in a shut-off position, to direct an air-material individual flow flowing into the inflow region of the return device via a return line of the return device to a return region, connected to the main conveying line, of the return device.

15 Claims, 9 Drawing Sheets

(56) References Cited

U.S. PATENT DOCUMENTS

| | | | | |
|---|---|---|---|---|
| 2007/0181048 A1* | 8/2007 | Pleyer | .................... | B65G 53/58 |
| | | | | 111/175 |
| 2017/0156258 A1* | 6/2017 | Reich | ..................... | A01C 7/084 |
| 2018/0317379 A1* | 11/2018 | Pirkenseer | ............. | A01C 7/084 |
| 2023/0109764 A1* | 4/2023 | Asche | .................... | A01C 7/084 |
| | | | | 239/8 |
| 2023/0133821 A1* | 5/2023 | Wien | .................... | A01C 7/084 |
| | | | | 111/174 |
| 2025/0153959 A1* | 5/2025 | Luebben | ................ | A01C 7/081 |

FOREIGN PATENT DOCUMENTS

| | | | | | |
|---|---|---|---|---|---|
| DE | 102015116378 | A1 * | 3/2017 | ............ | A01C 7/084 |
| DE | 102016218531 | A1 | 3/2018 | | |
| DE | 102017203855 | A1 * | 9/2018 | ............ | A01C 7/088 |
| EP | 3225093 | A1 | 10/2017 | | |
| EP | 3653036 | A1 * | 5/2020 | ............ | A01C 7/087 |
| EP | 3698614 | A1 | 8/2020 | | |
| EP | 3653036 | B1 * | 7/2022 | ............ | A01C 7/084 |
| FR | 2888465 | A1 | 1/2007 | | |
| WO | WO-2017055266 | A1 * | 4/2017 | ............ | A01C 7/088 |

* cited by examiner

Delivery devices

Control device

Distributor

Agricultural distribution machine

Fig. 9

DISTRIBUTOR FOR GRANULAR MATERIAL

This application is a 35 U.S.C. 371 national stage filing of International Application No. PCT/EP2021/055718, filed on Mar. 8, 2021, which claims priority to German Application No. DE 10 2020 106 966.9, filed on Mar. 13, 2020, the contents of which are hereby incorporated by reference.

The invention relates to a distributor for granular material, an agricultural distribution machine and a method for operating a distributor for granular material.

Agricultural distribution machines, such as seeders, include a plurality of delivery devices positioned next to each other, through which the granular material, for example seed, can be delivered in several parallel rows. Corresponding distribution machines usually have a so-called single row switching, wherein the material delivery along individual rows can be temporarily interrupted.

To implement such a single row switching, a plurality of air-material individual flows is generated in a distributor head of the distribution machine, each of which is assigned to a row. Via deflecting elements the corresponding air-material individual flows can optionally be directed to a delivery device, for example a sowing coulter, or diverted into a material return. The material return leads back into a main conveying line connected to the distributor head, which can be configured as a riser pipe, for example. A circulation of the returned material is thus implemented via the material return.

If several rows are switched off at the same time, the plurality of returned air-material individual flows will disturb the conveying flow in the main conveying line. To overcome this problem, air from a deflected air-material individual flow can be fed via a bypass line into a line section leading to a delivery element. The material circulation is thus maintained and at the same time excess air is removed and discharged from the system via the delivery elements. By separating and discharging the excess air, the conveying flow in the main conveying line is no longer disturbed by the material return, even with a plurality of rows switched off. A distributing tower operating according to this principle is known, for example, from WO 2017/055266 A1.

The return devices used for material return usually include a movable deflecting element which can be moved to a delivery position and a shut-off position. In the delivery position of the deflecting element, an air-material individual flow flowing into an inflow region of the return device is directed to a delivery region connected to a delivery line. In the shut-off position of the deflecting element, an air-material individual flow flowing into the inflow region of the return device is directed via a return line of the return device to a return region of the return device connected to the main conveying line.

In the solutions known from the prior art, there is a problem that there is a pneumatic connection between the return region and the delivery region of the return device, regardless of the position of the deflecting element. There is thus a risk of air flowing from the delivery region via the return region back into the main conveying line while the deflecting element is in the delivery position. This unintentional air return can disturb the air-material individual flow within the main conveying line, so that the material delivery to the distributor head is impaired. Furthermore, the unintentional return of air can disrupt the transport of material in the delivery line.

The object of the invention is thus to prevent a pneumatic connection between the delivery region and the return region of corresponding return devices when material return is not intended.

The object is achieved by a distributor of the type mentioned above, wherein the deflecting element of the distributor according to the invention is designed to shut off a bypass line of the distributor connecting the return region of the return device and the delivery region of the return device in the delivery position.

The invention makes use of the knowledge that the movable deflecting element of the return device can be used not only for deflecting an air-material individual flow onto a return path, but furthermore also for shutting off a bypass line. When the deflecting element of the distributor according to the invention is in the delivery position, there is no pneumatic connection between the return region or return line and the delivery region or delivery line, so that the risk of a pressure-induced disturbance of the material transport within the main conveying line and within the delivery line of the distributor is eliminated or at least considerably reduced when the deflecting element is in the delivery position. There is therefore no permanent pneumatic connection between the return region or return line and the delivery region or delivery line. The interruption of the pneumatic connection between the return region or the return line and the delivery region or the delivery line takes place in the distributor according to the invention via the position of the deflecting element. Air separation from the air-material individual flow via the bypass line is only possible in the shut-off position of the deflecting element. When the deflecting element is in the shut-off position, no material is delivered in the row associated with the return device.

The deflecting element is preferably a butterfly valve. The deflecting element is preferably rotatable or tiltable between the delivery position and the shut-off position. The movement of the deflecting element is preferably initiated by a reversing drive. The reversing drive can be an electric, pneumatic or hydraulic drive. There is preferably an interface between the return device and the reversing drive which allows the reversing element to be rotated remotely. Alternatively or additionally, the deflecting element can also be moved manually between the delivery position and the shut-off position via an external operating device.

The distributor head preferably includes a plurality of outlet openings. The plurality of outlet openings is preferably distributed over the circumference of the distributor head. The main conveying line can be a riser pipe. A portioning device can be arranged between the delivery region of the return device and the delivery device, for example the ploughshare. The portioning device is designed to generate material portions from a air-material individual flow, so that the granular material can be delivered in portions onto the farmland. The portioning device can be a valve or rotate. Furthermore, the portioning device can also be designed to produce portions of granular material in a different way.

In a preferred embodiment of the distributor according to the invention, the deflecting element is designed to release the bypass line in the shut-off position. Thus, in the shut-off position of the deflecting element, excess air can be separated from the deflected and returning air-material individual flow and fed to the delivery device via the bypass line.

It is also advantageous to have a distributor according to the invention wherein the deflecting element is configured as a rocker with two rocker legs, the rocker legs each extending radially outwards from a rotational axis of the deflecting element. Preferably, the deflecting element is configured as a double-sided rocker. In a first angle-of-rotation position of the deflecting element, an air-material individual flow flowing into the inflow region of the return device is directed to the discharge region of the return device. In a second angle-of-rotation position of the deflecting element, an individual air-material flow flowing into the inflow region of the return device is directed to the return region of the return device.

The distributor according to the invention is further advantageously embodied in that a rocker leg of the deflecting element is designed to shut off the bypass line of the return device in the delivery position of the deflecting element. Alternatively or additionally, a rocker leg of the deflecting element can be designed to shut off a passage between the inflow region of the return device and the return region of the return device in the delivery position of the deflecting element. The passage between the inflow region of the return device and the return region of the return device preferably runs at a distance from the bypass line. In particular, the passage between the inflow region of the return device and the return region of the return device runs parallel to the bypass line. Alternatively or additionally, at least one rocker leg of the deflecting element can be designed to shut off a passage between the inflow region of the return device and the delivery region of the return device when the deflecting element is in the shut-off position. The rocker leg which, in the shut-off position of the deflecting element, shuts off the passage between the inflow region of the return device and the delivery region of the return device, is preferably the rocker leg which, in the delivery position of the deflecting element, shuts off the passage between the inflow region of the return device and the return region of the return device.

In a further preferred embodiment of the distributor, the return device includes a separating body which separates the return line and the bypass line from one another at least in sections, the deflecting element preferably being designed to be in contact with the separating body in the shut-off position. The separating body and at least one rocker leg of the deflecting element preferably overlap in the shut-off position of the deflecting element. The separating body is preferably an elongated separating bridge. The separating body preferably extends into the vicinity of the rotational axis of the deflecting element so that the degree of coverage is maximised and the seal optimised.

In a further embodiment of the distributor according to the invention, the return device includes a stop rib, in particular a circumferential stop rib, between the delivery region and the bypass line. The deflecting element is preferably designed to be in contact with the stop rib in the delivery position. If the stop rib is configured circumferentially, it preferably forms a stop frame against which the outer edges of a rocker leg of the deflecting element abut. The stop rib also serves to optimise the sealing.

It is also advantageous to have a distributor according to the invention, wherein the deflecting element is made at least in sections of an elastic material. Preferably, the deflecting element is designed to deform elastically when assuming the delivery position and/or the shut-off position. In the delivery position and/or the shut-off position, a material tension is thus created which ensures a better seal in the delivery position and/or the shut-off position.

Furthermore, a distributor according to the invention is advantageous, wherein the return region of the return device is connected to a feed region of the main conveying line via a feed line. The main conveying line includes a riser pipe cross-section between the feed region and the distributor head and the main conveying line has a feed cross-section upstream of the feed region in the direction of flow, which is preferably configured as a nozzle. The riser pipe cross-section and the feed cross-section are in a ratio of 1:1 to 2:1, preferably about 1.4:1. The nozzle can be integrated into the main conveying line, wherein in the direction of flow upstream of the feed region means against the direction of delivery to the distribution head. Preferably, the main conveying line has a circular cross-section so that the main conveying line between the feed region and the distributor head has a larger diameter than in the direction of flow upstream of the feed region. Preferably, the diameter of the main conveying line between the feed region and the distributor head is larger than in the region of the nozzle integrated into the main conveying line. The larger cross-section can also be used to compensate for an increased air volume from the return device. The main conveying line is preferably configured as a corrugated pipe between the feed region and the distributor head. The nozzle, which is in front of the feed region in the flow direction, can be a replaceable nozzle.

A distributor according to the invention is also preferred, wherein in a transition region between the feed line and the main conveying line, a pressure level exists during operation of the distributor, which is higher than the pressure level in the delivery region of the return device, the pressure level in the return line of the return device and/or the pressure level in the bypass line of the return device, when the deflecting element is in the shut-off position. In the transition region between the feed line and the main conveying line, there is preferably a pressure level during operation of the distributor, which is lower than the pressure level in the delivery region of the return device, the pressure level in the return line of the return device and/or the pressure level in the bypass line of the return line, when the deflecting element is in the delivery position. The aforementioned pressure conditions exist during operation of the distributor in particular when the majority of the deflection elements of the return devices are in the delivery position.

The object of the invention is further achieved by an agricultural distribution machine of the type mentioned above, wherein the distributor of the distribution machine according to the invention is configured according to one of the embodiments described above. With regard to the advantages and modifications of the distribution machine according to the invention, reference is made to the advantages and modifications of the distributor according to the invention.

The object of the invention is furthermore achieved by a distributor of the type mentioned above, wherein as part of the method according to the invention the deflecting element, in the delivery position, shuts off a bypass line of the return device connecting the return region of the return device and the delivery region of the return device. When moving the deflecting element between the delivery position and the shut-off position, the deflecting element preferably performs a rotational movement.

In a preferred embodiment of the method according to the invention, the deflecting element releases the bypass line in the shut-off position. By releasing the bypass line, a pneumatic connection is established between the delivery region and the return region of the return device. This pneumatic connection is not present when the deflecting element is in the delivery position.

The method according to the invention is further advantageously embodied in that, in the delivery position of the deflecting element, a first rocker leg of the deflecting element shuts off a passage between the inflow region of the return device and the return region of the return device, and a second rocker leg of the deflecting element shuts off the bypass line of the return device.

Furthermore, a method according to the invention is advantageous, wherein, in the shut-off position of the deflecting element, a first rocker leg of the deflecting element shuts off a passage between the inflow region of the return device and the delivery region of the return device. Furthermore, a method according to the invention is advantageous, wherein the return region of the return device is connected to the main conveying line via a feed line, wherein a pressure level exists in a transition region between the feed line and the main conveying line which is higher than the pressure level in the delivery region of the return device, the pressure level in the return line of the return device and/or the pressure level in the bypass line of the return device, when the deflecting element is in the shut-off position. Alternatively or additionally, a pressure level exists in the transition region between the feed line and the main conveying line which is lower than the pressure level in the delivery region of the return device, the pressure level in the return line of the return device and/or the pressure level in the bypass line of the return device, when the deflecting element is in the delivery position.

In the following, preferred embodiments of the invention are explained and described in more detail with reference to the accompanying drawings, in which.

Figure 5:
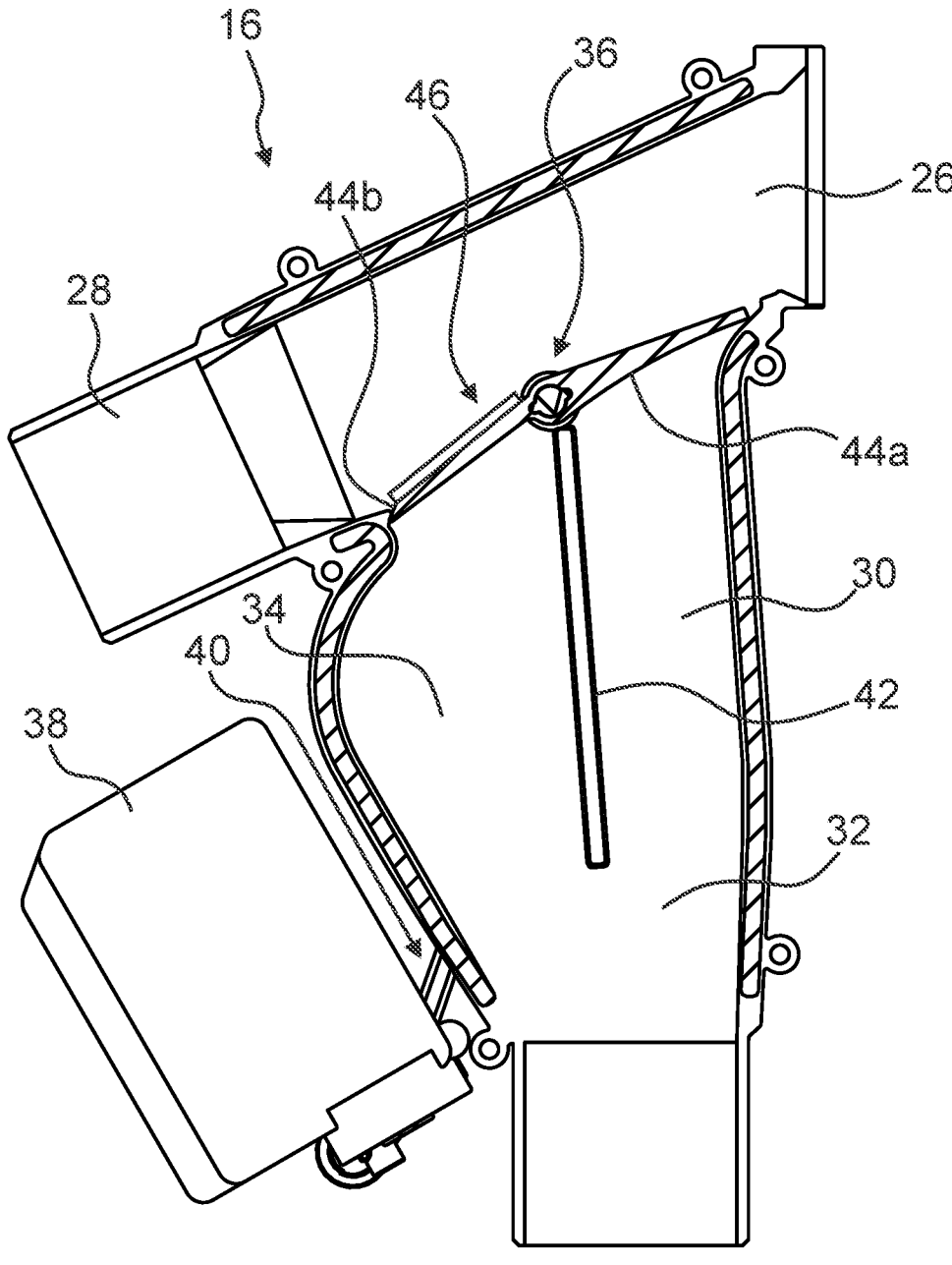
FIG. 5 is a sectional view of a return device of a distributor according to the invention, wherein the deflecting element is in the delivery position.
Figure 6:
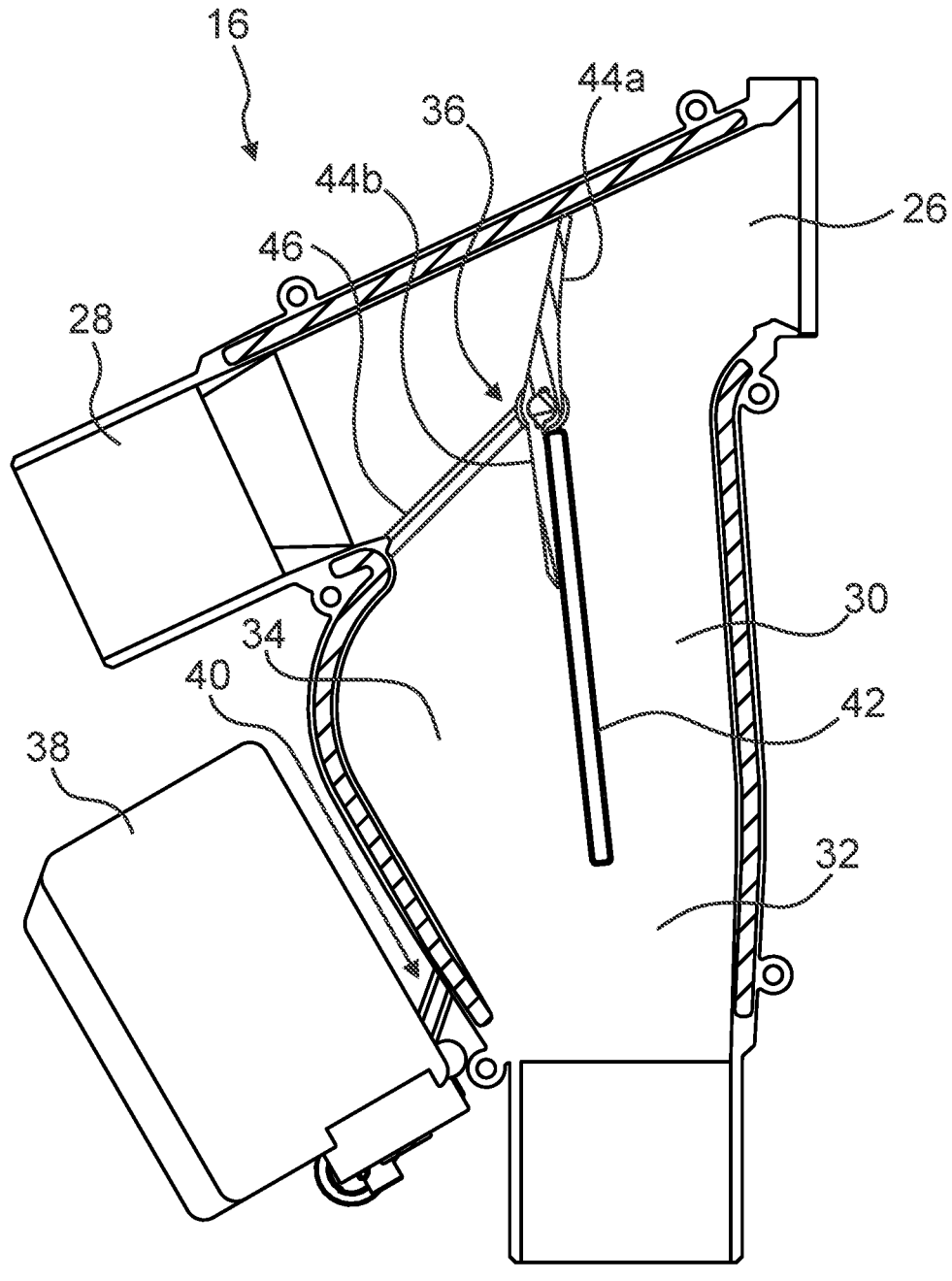
Figure 7:
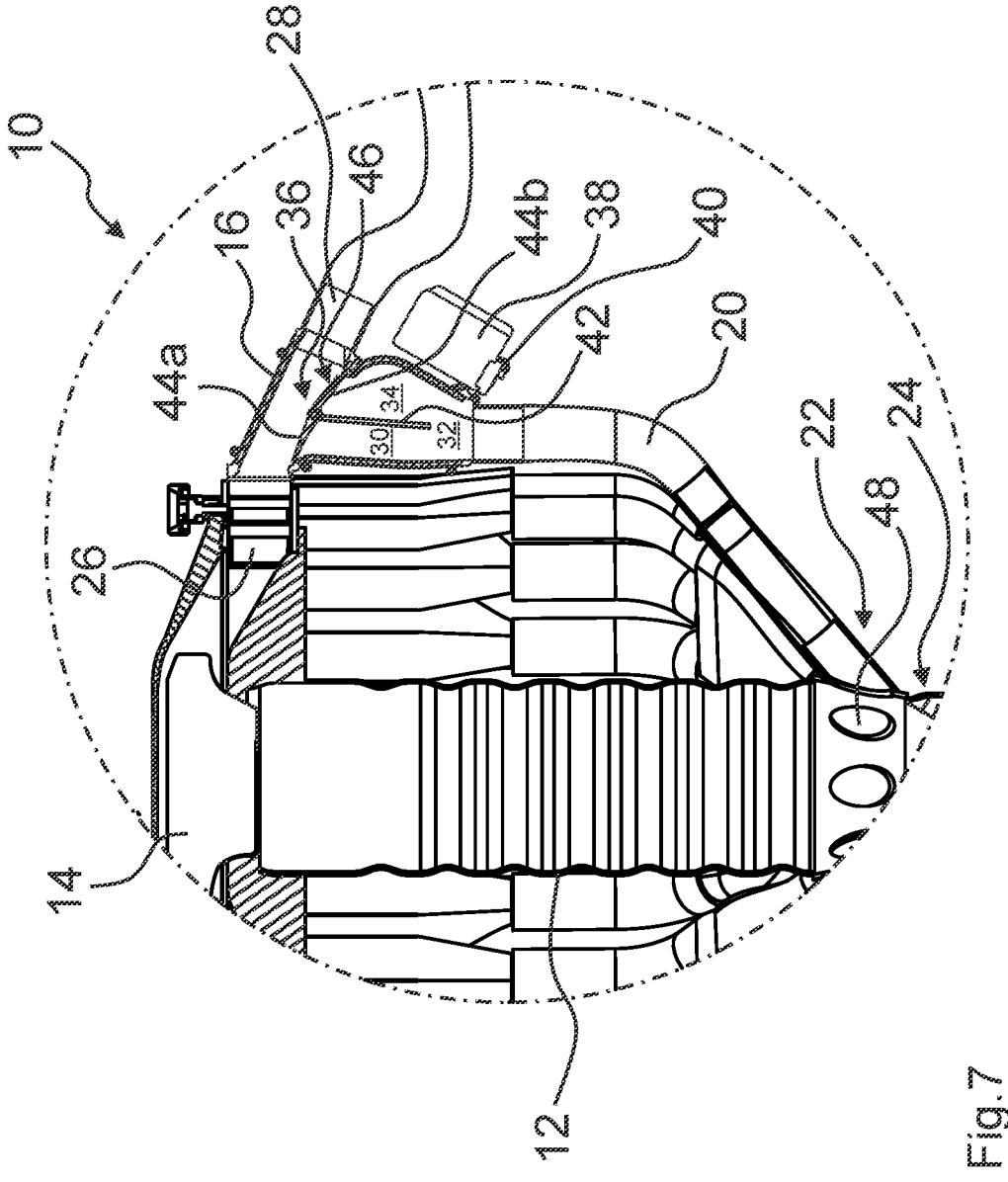
Figure 8:
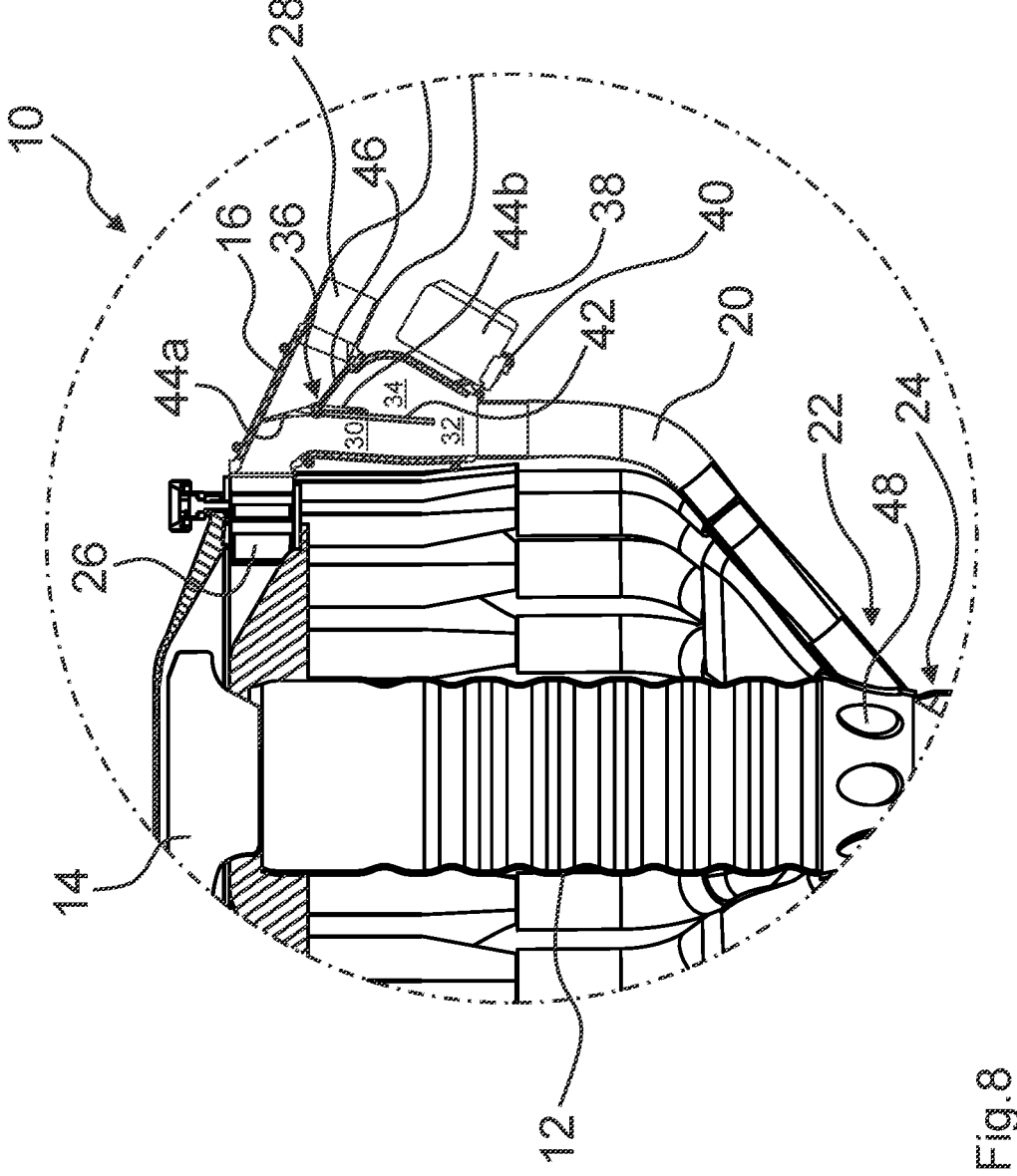

FIG. 6 also shows a sectional view of the return device shown in FIG. 5, wherein the deflecting element in the shut-off position;

FIG. 7 is a sectional view of a region of a distributor according to the invention, wherein the deflecting element of the return device is in the delivery position;

FIG. 8 is also a sectional view of the distributor shown in FIG. 7, wherein the deflecting element of the return device is in the shut-off position;

Figure 9:
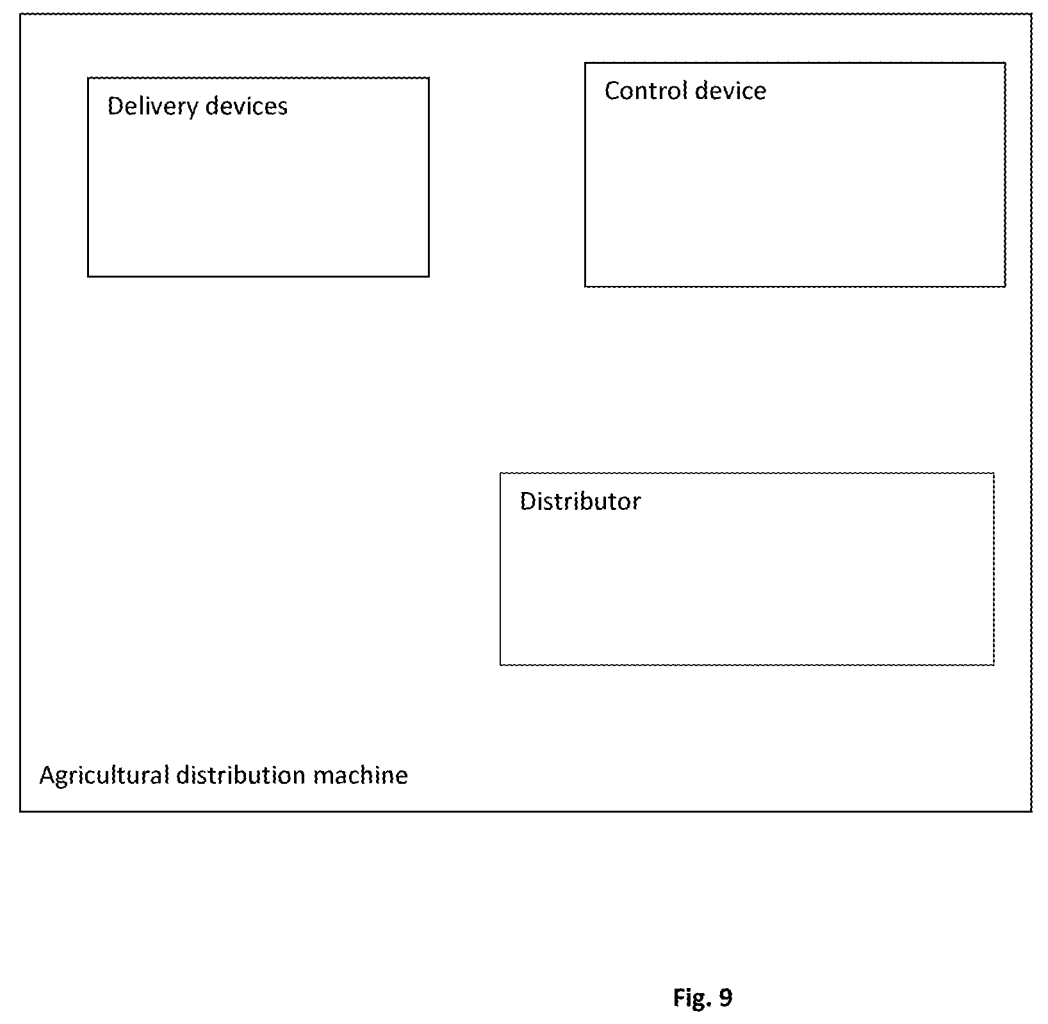

FIG. 9 shows some components of the distributor.

Figure 1:
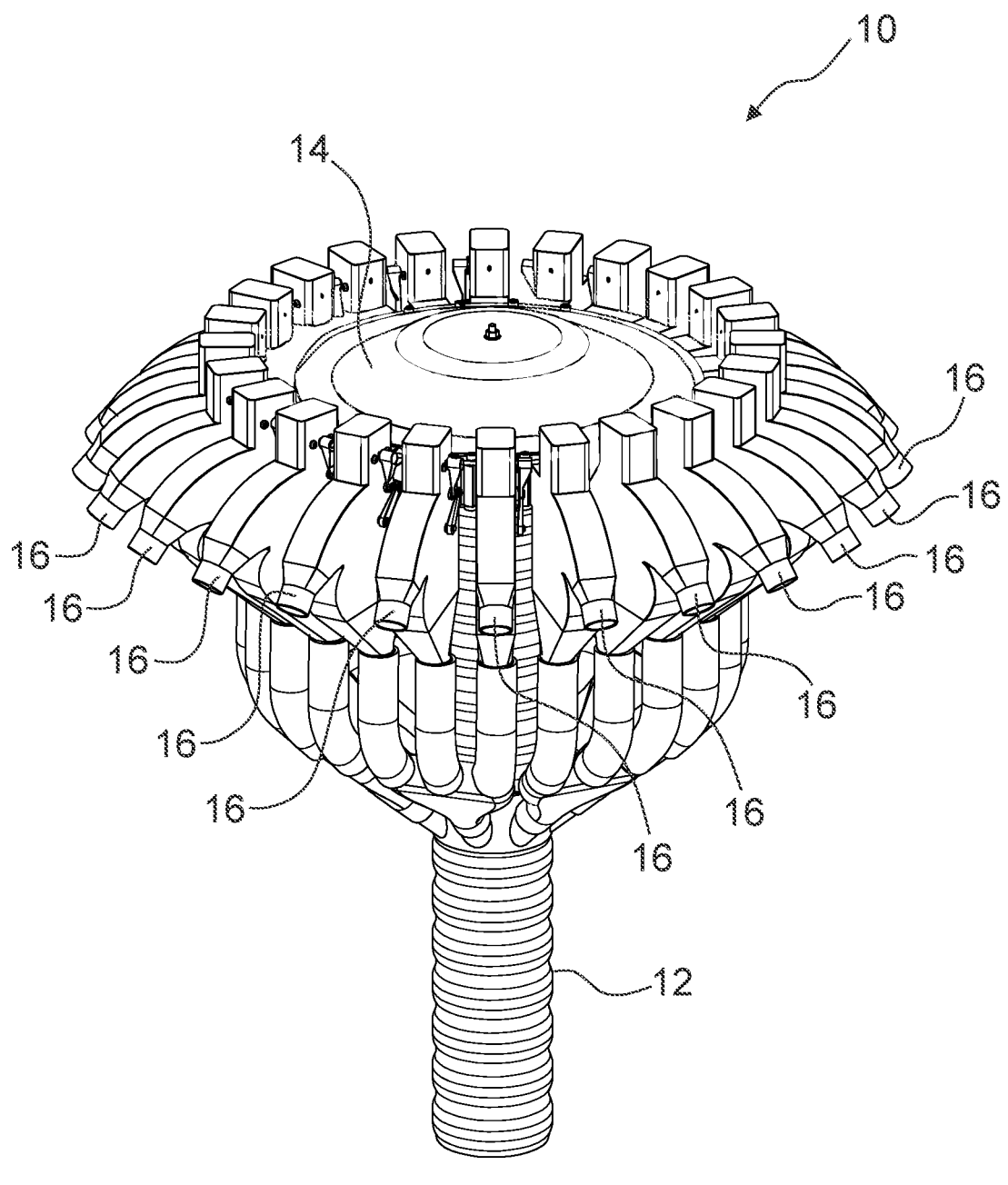
FIG. 1 is a perspective view of an exemplary embodiment of the distributor according to the invention.
Figure 2:
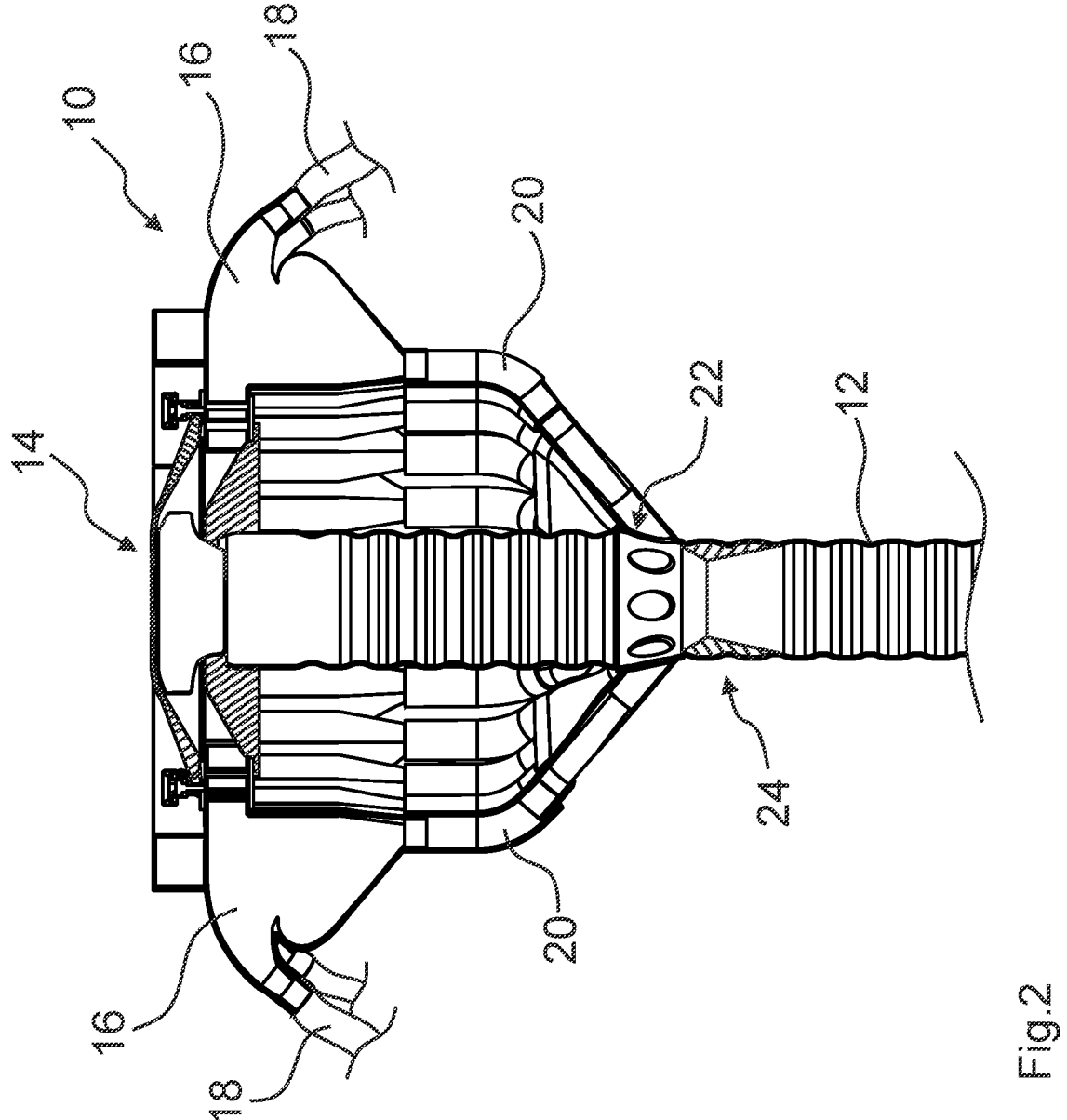
FIG. 2 is a side view of parts of the distributor shown in FIG. 1.

FIGS. 1 and 2 show a distributor 10 for granular material, for example seed or fertiliser. The distributor 10 includes a main conveying line 12, which is configured as a riser pipe. An air-material main flow can be supplied to a distribution head 14 of the distributor 10 via the main conveying line 12. The distributor head 14 is designed to divide up the air-material main flow into a plurality air-material individual flows.

The generated air-material individual flows are each supplied to a portioning device via a return device 16 and a delivery line 18, the portioning device being designed to generate material portions from the air-material individual flows so that the granular material can be deposited in portions onto farmland.

The agricultural distribution machine is designed to deliver the granular material onto the farmland in spaced rows.

The distributor 10 allows the implementation of a single row switching, wherein the delivery along individual rows can be temporarily interrupted. A single row can be switched off by interrupting the supply of granular material to the respective delivery line 18. For this purpose, the return devices 16 can deflect the respective air-material individual inflow so that it is not supplied to the discharge line 18, but to a feed line 20 via which the air-material individual flow is fed back into the main feed line 12.

The feed lines 20, which are each connected to a return device 16, are connected to a feed region 22 of the main conveying line 12. Below the feed region 22 and thus upstream of the feed region 22 in the direction of flow, a nozzle 24 is integrated into the main conveying line 12, which forms a feed cross-section of the main conveying line, the feed cross-section of the main conveying line 12 in the region of the nozzle 24 being in a ratio to a riser pipe cross-section of the main conveying line 12 between the feed region 22 and the distributor head 14, which is between 1:1 and 1:2, here approximately 1:1.4. The feed cross-section, i.e. the diameter of the nozzle 24, is thus preferably smaller than the riser pipe cross-section in the region of the main conveying line 12 between the nozzle 24 and the distributor head 14.

Figure 3:
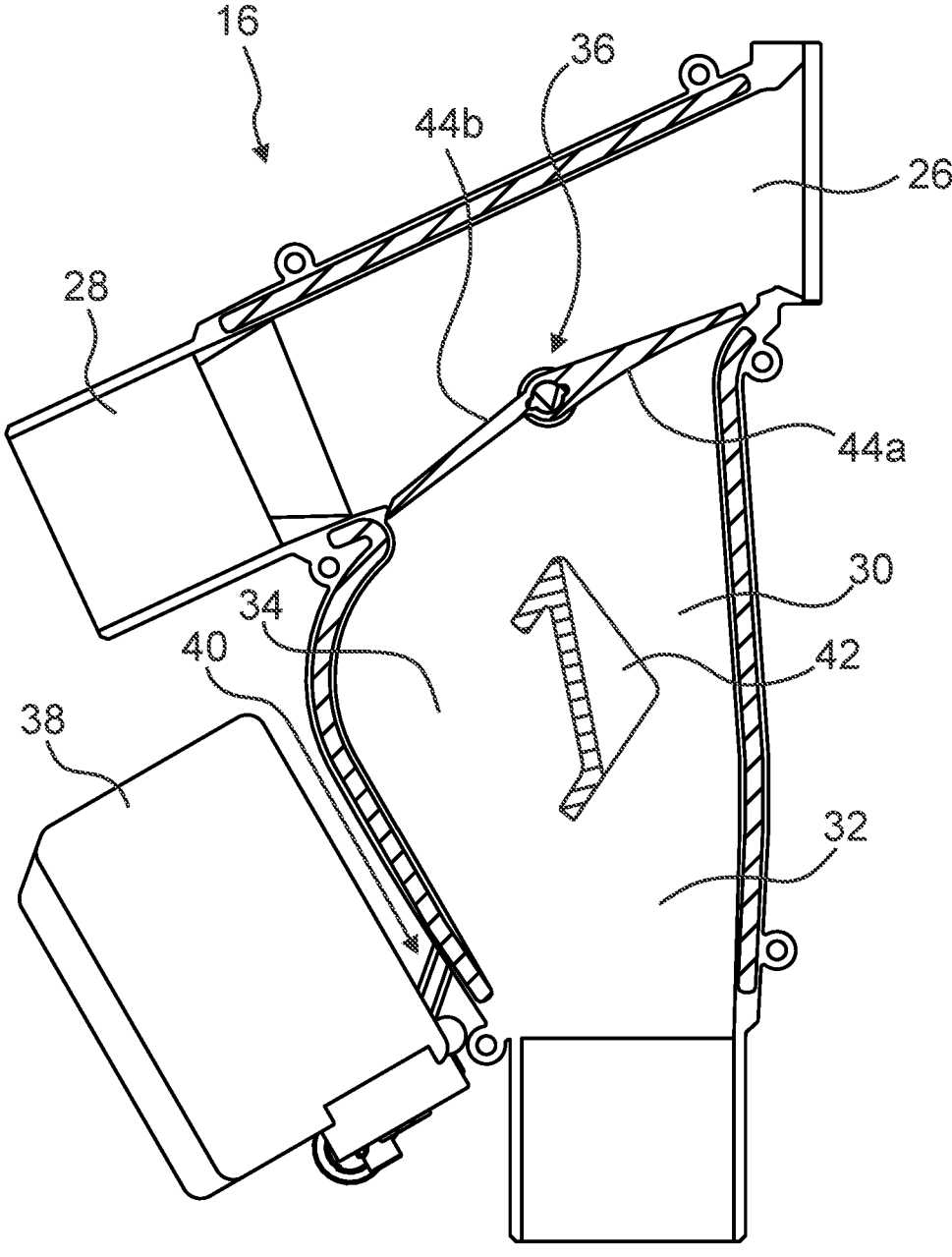
FIG. 3 is a sectional view of a return device of a distributor according to the invention, wherein the deflecting element is in the delivery position.
Figure 4:
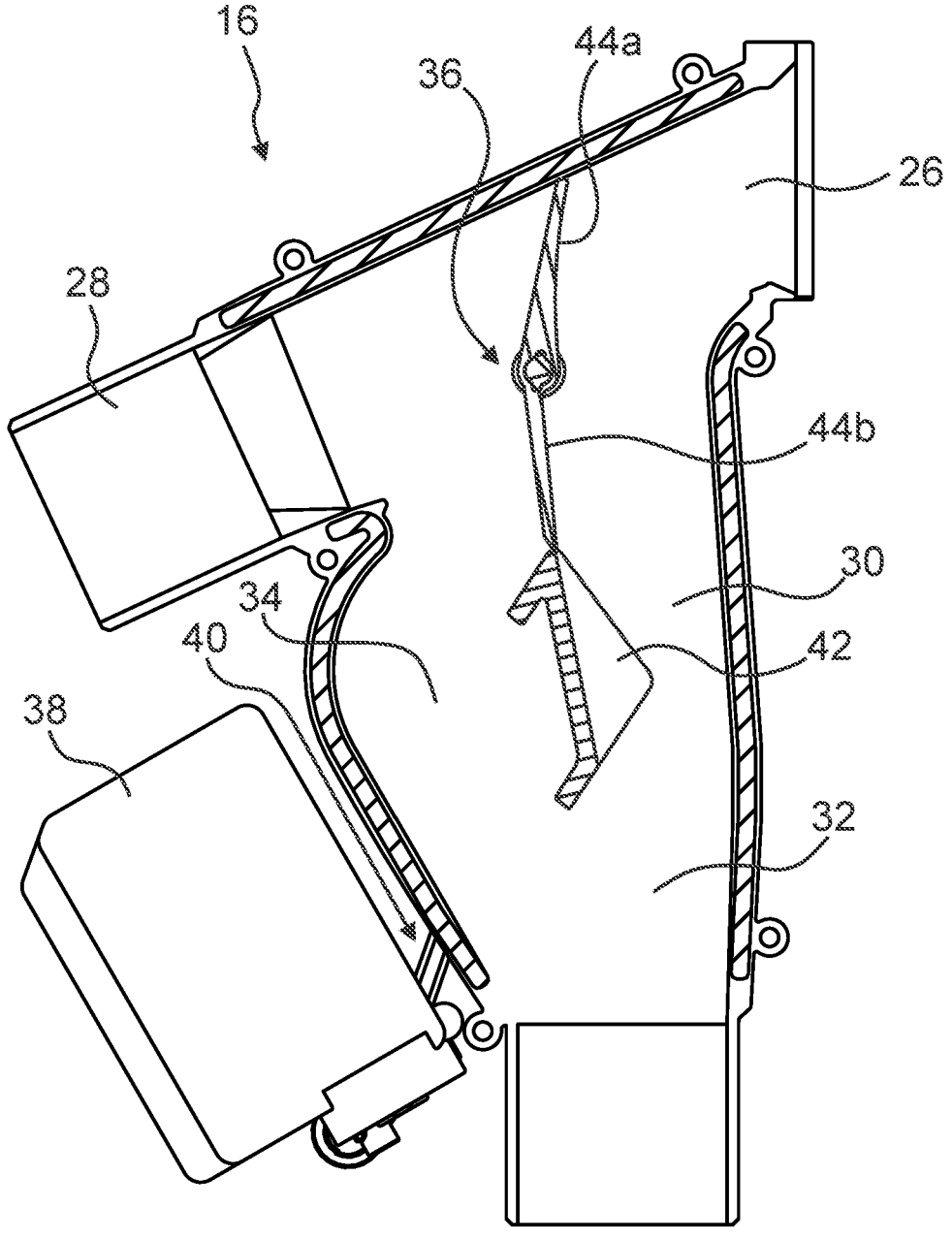
FIG. 4 is also a sectional view of the return device shown in FIG. 3, wherein the deflecting element in the shut-off position.

FIGS. 3 and 4 show a return device 16 of a distributor 10. The housing body of the return device 16 includes an inflow region 26, via which a air-material individual flow generated by the distributor head 14 can flow into the return device 16. When granular material is to be delivered onto the farmland land via the delivery device connected to the return device 16, the air-material individual flow entering via the inflow region 26 of the return device 16 is to be directed to the delivery region 28 of the return device 16. If the row is to be shut off, the air-material individual flow flowing into the return device 16 via the inflow region 26 is to be directed to the return region 32 of the return device 16. The air-material individual flow is directed to the return region 32 via the return line 30.

The return device 16 includes a movable deflecting element 36, which can be moved to a delivery position and to a shut-off position.

FIG. 3 shows the return device 16 with the deflecting element 36 in the delivery position. In the delivery position, the deflecting element 36 directs an air-material individual flow flowing into the inflow region 26 of the return device 16 towards the delivery region 28 of the return device 16. FIG. 4 shows the return device 16 with the deflecting element 36 in the shut-off position. In the shut-off position, the deflecting element 36 directs an air-material individual flow flowing into the inflow region 26 of the return device 16 to the return region 32 of the return device 16 via the return line 30.

The deflecting element 36 is rotatable between the delivery position and the shut-off position. The movement of the deflecting element 36 is initiated by a reversing drive 38. The reversing drive is an electric drive. The reversing drive 38 is connected to the deflecting element 36 via a reversing bar 40.

In the present case, the deflecting element 36 is configured as a rocker and is designed to shut off a bypass line 34 of the return device 16 connecting the return region 32 of the return device 16 and the delivery region 28 of the return device 16 in the delivery position. When the deflecting element 36 is in the delivery position shown in FIG. 3, there is no pneumatic connection between the return region 32 and the delivery region 28. This avoids a permanent pneumatic connection between the return region 32 and the delivery region 28. The interruption of the pneumatic connection between the return region 32 and the delivery region 28 is effected by the position of the deflecting element 36.

When the deflecting element 36 is in the shut-off position shown in FIG. 4, no material is delivered in the row associated with the return device 16. In the shut-off position, the deflecting element 36 releases the bypass line 34 so that air can be separated from the deflected air-material individual flow and transported away via the bypass line 34 and the delivery region 28. The air-material main flow within the main conveying line 12 is thus prevented from being disturbed by an excessive amount of returned air from the return devices 16.

The deflecting element 36 configured as a rocker includes two rocker legs 44a, 44b. The rocker legs 44a, 44b extend radially outwards from an rotational axis of the deflecting element 36.

The rocker legs 44a, 44b of the deflecting element 36 serve to shut off the bypass line 34 from the delivery region 28, when the deflecting element 36 is in the delivery position. Further, in the delivery position of the deflecting element member 36, the rocker legs 44a, 44b serve to shut off a passage between the inflow region 26 and the return region 32 of the return device 16. In the shut-off position of the deflecting element 36, the rocker legs 44a, 44b of the deflecting element serve to shut off a passage between the inflow region 26 and the delivery region 28 of the return device 16.

The distributor 10 further includes a separating body 42, which separates the return line 30 and the bypass line 34 from each other at least in sections, wherein the deflecting element 36 is designed to be in contact with the separating body 42 in the shut-off position.

In the embodiment of the return device 16 shown in FIGS. 5 and 6, the separating body 42 is configured as an elongated separating bridge which extends into the vicinity of the rotational axis of the deflecting element 36. The separating body 42 and the rocker leg 44b of the deflecting element 36 overlap in the shut-off position of the deflecting element 36.

Furthermore, in this embodiment, the return device 16 includes a circumferential stop rib 46 between the delivery region 28 and the bypass line 34, wherein the deflecting element 36 is in contact with the stop rib 46 in the delivery position shown in FIG. 5. Since the stop rib 46 is configured circumferentially, it forms a stop frame against which the outer edges of the rocker leg 44b of the deflecting element 36 abut in the delivery position of the deflecting element 36.

The rocker legs 44a, 44b of the deflecting element 36 may be made of an elastic material, so that they deform elastically when assuming the delivery position and/or the shut-off position.

FIGS. 7 and 8 show that the return region 32 of the return device 16 is connected to a feed region 22 of the main conveying line 12 via a feed line The main conveying line 12 has a larger cross-section between the feed region 22 and the distributor head 14 than in the direction of flow upstream of the feed region 22. In the direction of flow upstream of the feed region 22, a nozzle 24 is integrated into the main conveying line 12, which ensures a reduction in cross-section.

A pressure level exists in a transition region 48 between the feed line 20 and the main conveying line 12 which is higher than the pressure level in the delivery region 28 of the return device 16, the pressure level in the return line 30 of the return device 16 and/or the pressure level in the bypass line 34 of the return device 16, when the deflecting element 36 is in the shut-off position shown in FIG. 8.

As shown in FIG. 9, in another embodiment, the agricultural distribution machine comprises a control device for controlling the operation of the distribution machine, a plurality of delivery devices for delivering granular material onto farmland, and a distributor designed to divide up an air-material main flow into a plurality of air-material individual flows and to feed them to delivery devices predetermined by the control device.

REFERENCE SIGNS LIST

10 Distributor
12 Main feed line
14 Distributor head
16 Return devices
18 Delivery lines
20 Feed lines
22 Feed region
24 Nozzle
26 Inflow region
28 Delivery region
30 Return line
32 Return region
34 Bypass line
36 Deflecting element
38 Reversing drive
40 Reversing bar
42 Separating body
44a, 44b Rocker leg
46 Stop rib
48 Transition region

The invention claimed is:

1. A distributor for granular material, comprising
a distributor head which is designed to divide up an air-material main flow supplied through a main conveying line to the distributor head into a plurality of air-material individual flows; and
at least one return device, which comprises a movable deflecting element which is designed, in a delivery position, to supply an air-material individual flow flowing into an inflow region of the return device to a delivery region, connected to a delivery line, of the return device and, in a shut-off position, to direct an air-material individual flow flowing into the inflow region of the return device via a return line of the return device to a return region, connected to the main conveying line, of the return device; wherein the deflecting element is designed to shut off a bypass line of the return device connecting the return region of the return device and the delivery region of the return device in the delivery position, and wherein the deflecting element is designed as a rocker with two rocker legs, the rocker leas each extending radially outwards from a rotational axis of the deflecting element.

2. The distributor of claim 1, wherein the deflecting element is designed to release the bypass line in the shut-off position.

3. The distributor of claim 1, wherein:
a rocker leg of the deflecting element is designed to shut off the bypass line of the return device in the delivery position of the deflecting element;
a rocker leg of the deflecting element is designed to shut off a passage between the inflow region of the return device and the return region of the return device in the delivery position of the deflecting element; and/or at least one rocker leg of the deflecting element is designed to shut off a passage between the inflow region of the return device and the delivery region of the return device in the shut-off position of the deflecting element.

4. The distributor of claim 1, wherein the return device includes a separating body, which separates the return line and the bypass line from one another at least in sections, the deflecting element preferably being designed to be in contact with the separating body the shut-off position.

5. The distributor of claim 1, wherein the return device includes a circumferential stop rib, between the delivery region and the bypass line the deflecting element being designed to be in contact with the stop rib in the delivery position.

6. The distributor of claim 1, wherein the deflecting element is made, at least in sections, of an elastic material and is designed to deform elastically when assuming the delivery position and/or the shut-off position.

7. The distributor of claim 1, wherein the return region of the return device is connected via a feed line to a feed region of the main conveying line, and wherein the main conveying line includes a riser pipe cross-section between the feed region the distributor head, wherein the main conveying line includes a feed cross-section upstream of the feed region in the direction of flow, the feed cross-section being preferably configured as a nozzle, and the riser pipe cross-section and the feed cross-section are in a ratio of 1:1 to 2:1.

8. The distributor of claim 7, wherein a pressure level exists in a transition region between the feed line and the main conveying line which is higher than the pressure level in the delivery region of the return device, the pressure level in the return line of the return device and/or the pressure level in the bypass line of the return device, when the deflecting element is in the shut-off position.

9. Agricultural distribution machine, comprising:

a control device for controlling the operation of the distribution machine, a plurality of delivery devices for delivering granular material onto farmland, and the distributor of claim 1, which is designed to divide up an air-material main flow into a plurality of air-material individual flows and to feed them to delivery devices predetermined by the control device.

10. A method for operating the distributor of claim 1 comprising:

supplying an air-material main flow to a distribution head of the distributor through a main conveying line of the distributor;

dividing up the air-material main flow supplied to the distribution head into several air-material individual flows; and moving of a deflecting element of at least one return device into a delivery position, in which the deflecting element supplies an air-material individual flow flowing into an inflow region of the return device to a delivery region, connected to a delivery line, of the return device, or, into a shut-off position, in which the deflecting element directs an air-material individual flow flowing into the inflow region of the return device via a return line of the return device to a return region, connected to the main conveying line, of the return device;

wherein in the delivery position, the deflecting element shuts off a bypass line of the return device connecting the return region of the return device and the delivery region of the return device.

11. The method according to claim 10, wherein the deflecting element releases the bypass line in the shut-off position.

12. The method according to claim 10, wherein in the delivery position of the deflecting element, a first rocker leg of the deflecting element shuts off a passage between the inflow region of the return device and the return region of the return device, and a second rocker leg of the deflecting element shuts off the bypass line of the return device.

13. The method of claim 10, wherein in the shut-off position of the deflecting element, a first rocker leg of the deflecting element shuts off a passage between the inflow region of the return device and the delivery region of the return device.

14. The method of claim 10, wherein the region of the return device is connected to the main conveying line via a feed line, wherein a pressure level exists in a transition region between the feed line and the main conveying line which is higher than the pressure level in the delivery region of the return device, the pressure level in the return line of the return device and/or the pressure level in the bypass line of the return device, when the deflecting element is in the shut-off position; and/or wherein a pressure level exists in the transition region between the feed line and the main conveying line which is lower than the pressure level in the delivery region of the return device, the pressure level in the return line of the return device and/or the pressure level in the bypass line of the return device, when the deflecting element is in the delivery position.

15. A distributor for granular material, comprising:

a distributor head which is designed to divide up an air-material main flow supplied through a main conveying line to the distributor head into a plurality of air-material individual flows; and at least one return device, which comprises a movable deflecting element which is designed, in a delivery position, to supply an air-material individual flow flowing into an inflow region of the return device to a delivery region, connected to a delivery line, of the return device and, in a shut-off position, to direct an air-material individual flow flowing into the inflow region of the return device via a return line of the return device to a return region, connected to the main conveying line, of the return device; wherein the deflecting element is designed to shut off a bypass line of the return device connecting the return region of the return device and the delivery region of the return device in the delivery position, wherein the return device includes a circumferential stop rib, between the delivery region and the bypass line, the deflecting element being designed to be in contact with the stop rib in the delivery position.

* * * * *